Jan. 8, 1924.
W. A. RINGLER
VISIBLE CARD SYSTEM
Filed Sept. 25, 1920    3 Sheets-Sheet 2
1,480,419
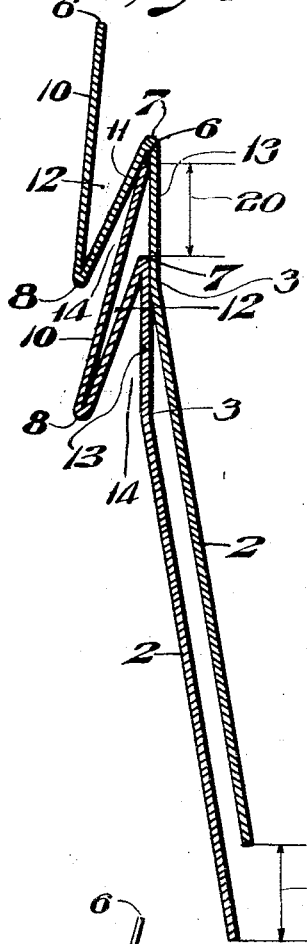
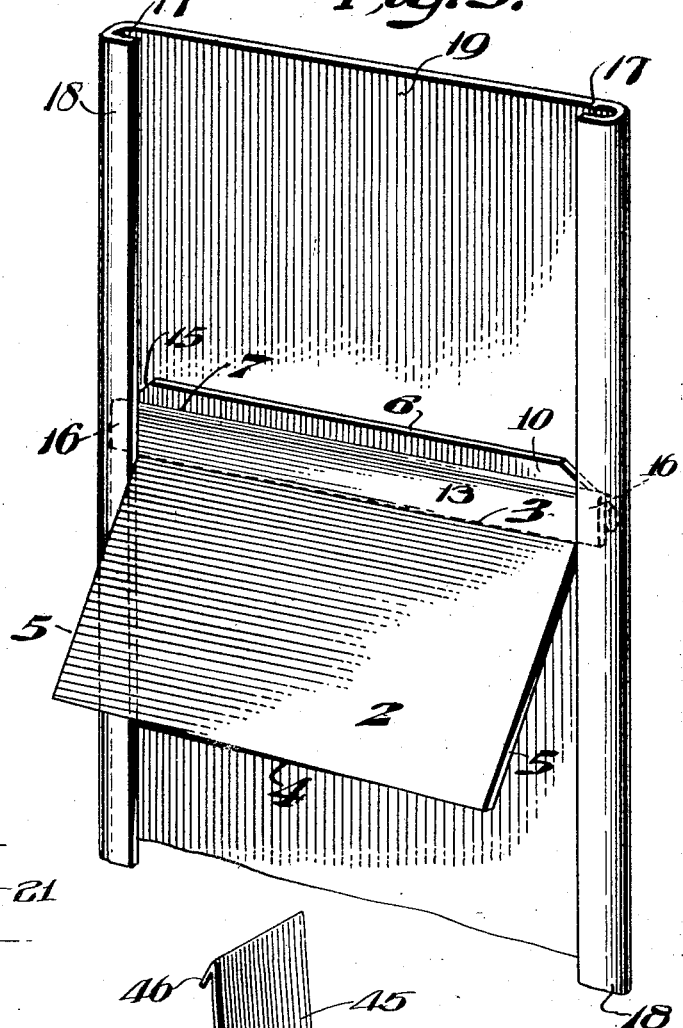
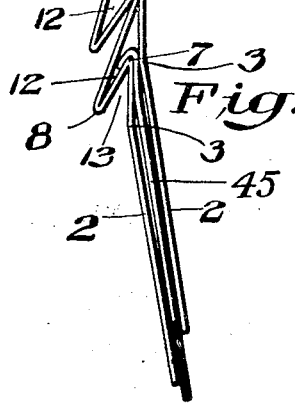
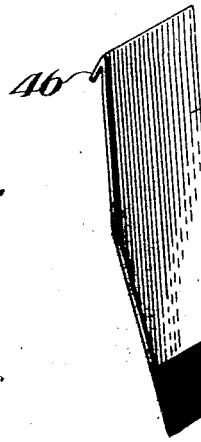
INVENTOR:
William A. Ringler
BY Wiedersheim + Fairbanks
ATTORNEYS Jan. 8, 1924.
W. A. RINGLER
1,480,419
VISIBLE CARD SYSTEM
Filed Sept. 25, 1920   3 Sheets-Sheet 3
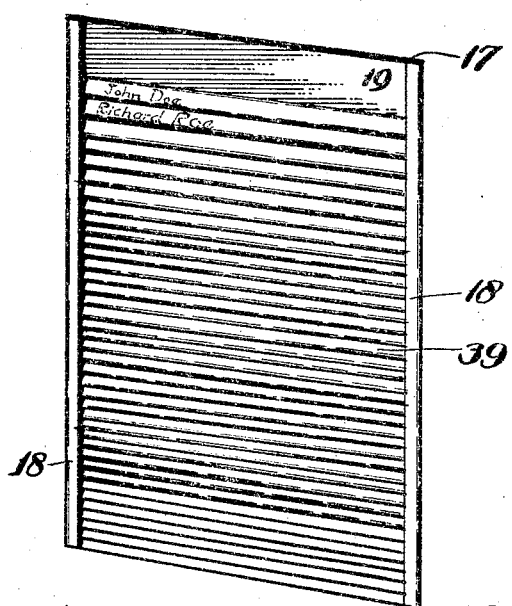
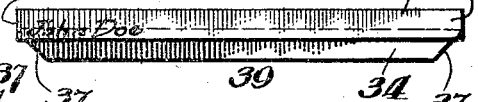
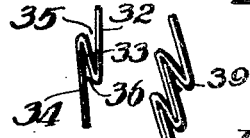
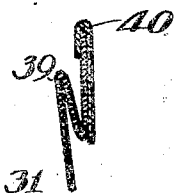
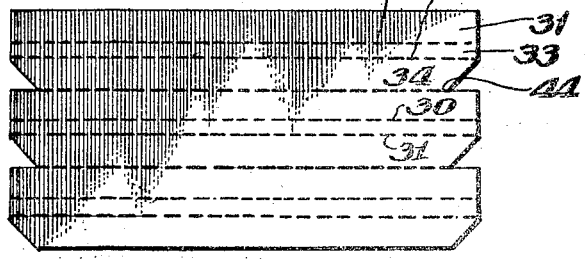
INVENTOR:
William A. Ringler
BY Wiedersheim & Fairbanks
ATTORNEYS.

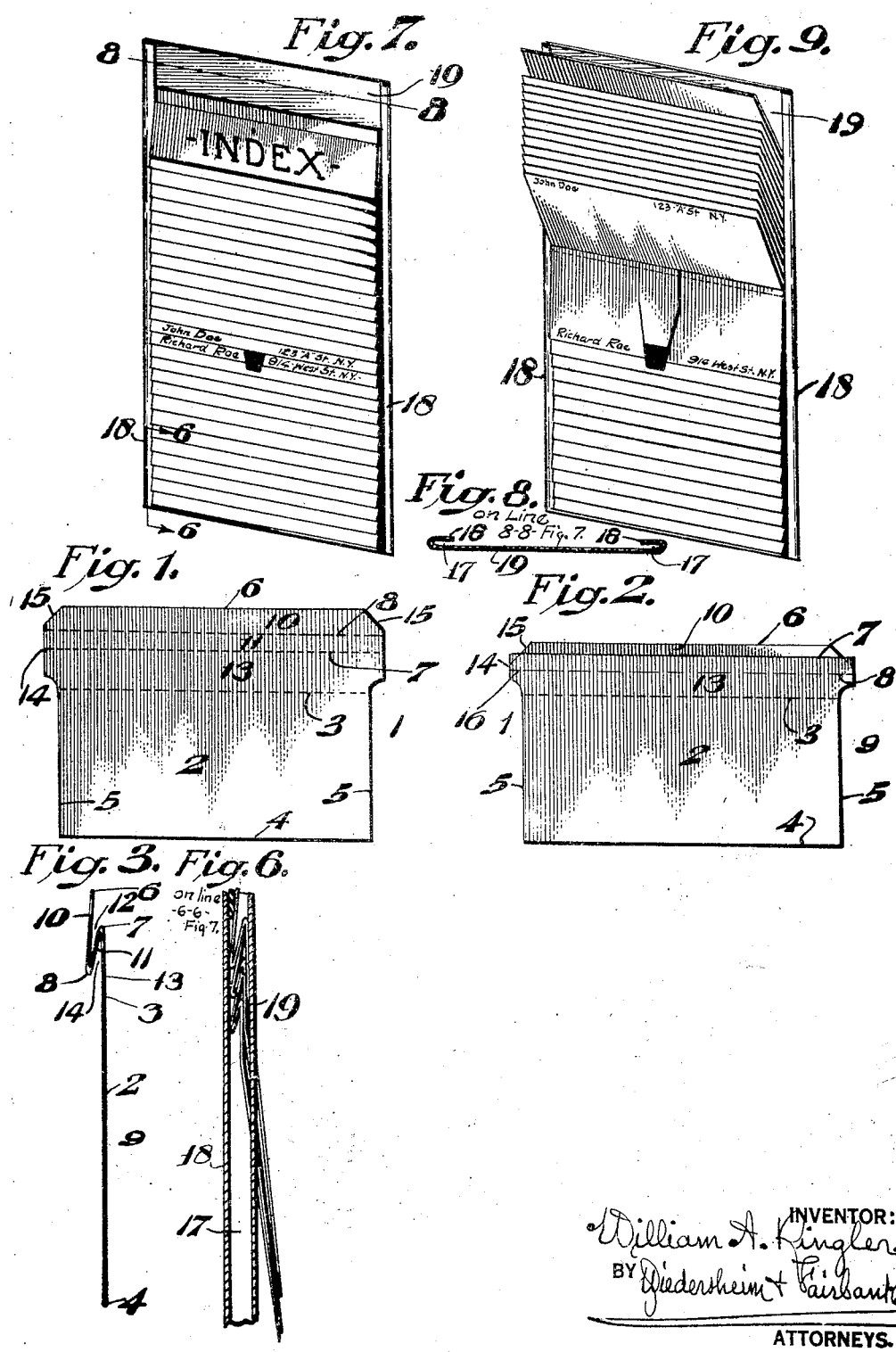

Patented Jan. 8, 1924.

1,480,419

UNITED STATES PATENT OFFICE.

WILLIAM A. RINGLER, OF NEW YORK, N. Y., ASSIGNOR TO GLOBE WERNICKE CO., OF CINCINNATI, OHIO, A CORPORATION OF OHIO.

VISIBLE CARD SYSTEM.

Application filed September 25, 1920. Serial No. 412,855.

*To all whom it may concern:*

Be it known that I, WILLIAM A. RINGLER, a citizen of the United States, residing in the city and county of New York, State of New York, have invented a new and useful Visible Card System, of which the following is a specification.

My present invention in its broad and generic scope comprehends a novel construction of a visible card system which occupies a minimum of space and which can be more economically manufactured than the card systems now in use.

It further comprehends a novel visible card system wherein I am enabled to dispense with the necessity of employing a card holder, the cards being of novel construction so that they can be readily inserted into and removed from the filing unit when desired.

It further comprehends a novel construction of card units which are adapted to interlock with each other and be slidably mounted in the frame of the filing unit in such manner that a portion of each card is visible.

It further provides novel means for the quick insertion or removal of any card from its supporting frame.

It further comprehends a novel construction of a signal which can be assembled with respect to any desired card without removing the card from the frame or panel which forms the support for a card of the card unit.

It further comprehends a novel construction of a card index and a novel construction and arrangement of a transparent protecting means therefor.

Other novel features of construction and advantage will hereinafter more fully appear in the detailed description and the appended claims.

For the purpose of illustrating my invention, I have shown in the accompanying drawings typical embodiments of it which are at present preferred by me, since these embodiments will be found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents, in detached position, a plan view of a card blank, embodying my invention.

Figure 2 represents a plan view of a filing card formed by bending the card blank seen in Figure 1.

Figure 3 represents, in side elevation, the card seen in Figure 3.

Figure 4 represents, in side elevation, and on an enlarged scale, a plurality of cards in the relative positions which they assume before being assembled in the frame or panel.

Figure 5 represents, in perspective, the frame with a card therein as it appears during the operation of placing the card in the frame.

Figure 6 represents a section on line 6—6 of Figure 7.

Figure 7 represents, in perspective, the cards assembled in the frame showing the visible portion of the cards.

Figure 8 represents a section on line 8—8 of Figure 7.

Figure 9 represents, in perspective, the cards assembled in the frame, with a number of the cards lifted to show the recording portion of a card.

Figure 10 represents, in perspective, a frame with modified index cards embodying my invention.

Figure 11 represents a top plan view of an indexed blank.

Figure 12 represents a top plan view of an index formed from the blank seen in Figure 11.

Figure 13 represents an end elevation of the construction seen in Figure 12.

Figure 14 represents in end elevation a plurality of the indexes in assembled position and in interlocked relationship.

Figure 15 represents a top plan view of a transparent protector for an index.

Figure 16 represents a section on line 16—16 of Figure 15.

Figure 17 represents, in sectional elevation, a card index with the protector in position.

Figure 18 represents, in end elevation, a plurality of card indexes with their protectors, the card indexes being in assembled position with respect to each other.

Figure 19 represents a top plan view of a plurality of the card indexes before they have been separated.

Figure 20 represents an end elevation of a plurality of cards with a signal in place.

Figure 21 represents, in perspective and in detached position, the signal seen in Figure 20.

Similar numerals of reference indicate corresponding parts.

Referring to the drawings.

1 designates a card blank adapted to be used in a card system embodying my invention. The blank is preferably composed of paper and has a recording portion 2 which may be said to form the body portion of the card between the dotted line 3, the bottom edge 4 and the side edges 5. The portion of the card from the dotted line 3 to the upper edge 6 is weakened in any desired manner, for example, by bending, scoring or creasing on the line 3 and the lines 7 and 8 and in the form illustrated the distance between the weakened lines 7 and 8 is less than the distance between the lines 3 and 7 or between the line 8 and the top of the card. The card is then bent at its upper portion rearwardly on the line 7 and upwardly at the line 8, as will be understood by reference to Figure 2, the completed card being designated by 9 in said Figure 2. In this manner a terminal tab 10 is formed which forms with the downwardly directed flange 11 an acute angle 12. The flange 11 forms with the strip 13 an acute angle 14.

In this manner what may be called a zig-zag reinforcement is formed at the upper end of the card. In pressing the member 10 against the flange or section 11 a resilient spring action is obtained. The resiliency is such as to allow the terminal tab 10 of the next card below to slide into the groove or recess formed by the acute angle 14 when the cards are assembled. If desired, the terminal tab 10 may have its marginal edges at the end cut away or beveled, as at 15, in order to facilitate the assembling of the cards but this can be omitted without departing from the spirit of my invention.

The locking portion of the card is provided with means or constructed with means to enable it to be slidably mounted in the frame or panel and, as illustrated, is provided with the laterally extending locking members 16 which are slidable in grooves 17 formed by the inturned flanges 18 of a panel 19.

Special attention is directed to the fact that the distance 20 which the terminal tab 10 extends above a fold at the upper portion of the card on the weakened line 7 or, in other words, above the upper fold of the card, determines the width of the visible space, as indicated at 21, when the cards are assembled. In other words, it determines the distance which the lower portion of one card overlaps the lower portion of the juxtaposed card. One or more cards can be readily assembled with respect to the panel by bending the card or cards at the central portion and inserting the locking members or side securing tabs 16 into the grooves 17. It will be understood from Figure 4 that the upper fold of a card formed by the bending downward of the section or flap 11 when the cards are assembled preferably is positioned above the weakened line 3, it being understood that the weakened line 3 enables the ready bending of a card when assembled in the frame.

Referring now more particularly to Figures 10 to 19 inclusive, I have illustrated in these figures the cards of the card system. In Figure 11, I have shown a blank 29 from which the card is formed by the bending of the blank. The blank is provided with the weakened lines 30 and 31 extending longitudinally and preferably disposed in parallelism thereby forming a terminal tab 32, a downwardly extending fold 33 and a downwardly extending flap 34 so that an upper pocket 35 is formed and a lever pocket 36, the flap 34 preferably having its ends cut away as indicated at 37, and the blank is of such length that the ends 38, see Figure 12, are adapted to slide in and be received in the grooves 17 of the panel 19. The index strips 39, see Figure 12, interlock with each other in a similar manner to the locking portions of the cards, as will be clearly understood by reference to Figure 14 without further detailed description.

40 designates a transparent protecting strip ordinarily made of celluloid and consists of a body portion 41 having an overhanging lip 42 thereby forming a groove 43 to enable it to be slid over the upper terminal tab 32 of the card index, as will be clearly understood by reference to Figure 17.

In Figure 18, I have shown a plurality of index strips in the position which they assume when assembled and with the protectors in place.

In writing on the index strips on a typewriter it is advantageous to fill them out before they have been separated from the blank into individual index blanks and for this purpose the blanks in practice are formed as seen in Figure 19 with the weakened lines 44 to enable the index strips to be readily separated after the desired data has been filled out by the typewriter and they are then folded to form a card index element 39 as seen in Figure 12.

It is also within the scope of my invention to employ a signal in order to draw attention or render more prominent a certain card or the data on it and for this purpose, I employ a signal as seen in Figures 20 and 21. The signal consists of a strip of sheet material 45 having at its upper end a downwardly extending lip or flange 46 in order to enable it to be assembled with respect to any desired card as seen in Figure 20, it being apparent that when the cards are assembled in their frame all that it is necessary to do is to move the signals upwardly to permit the flange 46 to pass over the upper fold formed by the sections 13 and 11. When the signal is drawn downwardly it will interlock with the fold and the superimposed card will exert a pressure against it to retain it in position.

The signal card may be of any desired color or the visible tip may be colored or have imprinted upon it indicating data of any character. The signal is of such length that the tip is visible as will be understood by reference to Figures 7 and 9.

It is of course to be understood that where in the description and the claims I refer to a filing card that I do not intend to be limited to a card of cardboard or pasteboard but intend these words to define a card of sheet material of any desired character and of any desired thickness.

It will now be apparent that I have devised a novel and useful construction of a visible card system which embodies the features of advantage enumerated as desirable in the statement of the invention and the above description, and while I have, in the present instance, shown and described preferred embodiments thereof which will give in practice satisfactory and reliable results, it is to be understood that such embodiments are susceptible of modification in various particulars without departing from the spirit or scope of the invention or sacrificing any of its advantages.

Having thus described my invention, what I claim as new and desire to secure by Letters Patent, is:—

1. A filing card having a locking portion and a recording portion and having the locking portion wider than and of less area than the recording portion, the locking portion being folded inwardly and then outwardly to form a yieldable locking portion to interlock with the juxtaposed card.

2. A filing card formed from a single sheet of material having a locking portion and a recording portion of greater area than the locking portion, the locking portion being formed by folding the card at one end inwardly and then outwardly whereby yieldable locking portions are formed at the sides which extend beyond the marginal edges of the card.

3. A card formed from a single sheet of material and deflected near one end inwardly and then outwardly to form a locking portion yieldable throughout the length of the locking portion, the outward extension of said locking portion projecting beyond the recording portion of the card.

4. A filing card double folded in proximity to one of its edges to form a terminal tab extending beyond the fold of the card nearest to the outer edge of the terminal tab, said card having a recording portion of greater area than that of the folded portion.

5. A filing card double folded in proximity to one of its edges to form a terminal tab extending beyond the fold of the card nearest to the outer edge of the terminal tab, the folded portion extending beyond the side edges of the recording portion of the card to form a yieldable locking portion.

6. A filing card having a pair of weakened lines in parallelism to one of its edges and on which it is folded to provide an outwardly extending terminal tab the distance between said weakened lines being less than the width of said terminal tab.

7. The combination with a plurality of juxtaposed filing cards, of a signal comprising a strip of material having an overhanging lip insertable between and held in place by the juxtaposed cards and interlocking with one of them.

8. The combination with a plurality of juxtaposed filing cards, of a signal comprising a strip of material having an overhanging lip insertable between and held in place by juxtaposed cards and interlocking with one of them, and slidable on the card which carries it.

9. The combination with a plurality of juxtaposed filing cards, of a signal comprising a strip of material having an overhanging lip insertable between and held in place by juxtaposed cards and interlocking with one of them and of such length as to have a visible portion when assembled.

WILLIAM A. RINGLER.

Witnesses:
H. S. FAIRBANKS,
F. A. NEWTON.